United States Patent Office 3,398,103
Patented Aug. 20, 1968

3,398,103
FOAM PLASTICS AND PROCESS
FOR MAKING THEM
Alfred Kühlkamp, Hofheim, Taunus, and Rudolf Nowack, Frankfurt am Main, Germany, assignors to Farbwerke Hoechst Aktiengesellschaft vormals Meister Lucius & Bruning, Frankfurt am Main, Germany, a corporation of Germany
No Drawing. Filed May 10, 1965, Ser. No. 454,661
Claims priority, application Germany, May 16, 1964,
F 42,907
18 Claims. (Cl. 260—2.5)

ABSTRACT OF THE DISCLOSURE

There is disclosed herein a porous foamed plastic composition, and a method for making such a composition, which comprises the reaction product formed at about room temperature without the addition of heat from approximately equivalent amounts of (1) a compound having at least two acidic hydrogen atoms each of which is on a carbon atom immediately adjacent a carboxyl group or a nitrilo group, (2) a carbamate reaction product of carbon dioxide and a primary or a secondary polyamine, and (3) an aldehyde.

The present invention relates to foam plastics and a process for making them.

Foam plastics have been used as insulating materials in building and heat engineering and for damping mechanical vibrations.

The present invention provides a process for the manufacture of foam plastics wherein polyesters, polyethers, polyols or polyamines having at least two CH-acid radicals bound via oxygen or nitrogen atoms are treated, in a process corresponding to aminoalkylation, with an aldehyde and a reaction product of a polyamine and $CO_2$. In this process, 5 to 95% of the polyesters, polyethers, polyols or polyamines carrying CH-acid radicals or of the mixtures of these substances may be replaced by copolymers carrying CH-acid groups.

Reaction products of amines with carbon dioxide have already been described in the literature (cf. "The Chemical Structure of Some Diamine Carbamates," J.A.C.S., 73, 1829 (1951)).

The process of the invention has the advantage over the known processes for the manufacture of foam plastics from polyesters and the like that the $CO_2$ serving as expanding agent is not produced by reacting highly reactive isocyanates with water but by splitting it off from the above mentioned reaction product of $CO_2$.

The isocyanates used for making polyurethane foam plastics are very sensitive to water. It is possible to add exactly measured quantities of water to the batch of foam plastic. However, in that case it is desired to obtain a determined chemical reaction, for example, liberation of $CO_2$ and formation of urea bridges. If, however, the batch of foam plastic comes in contact with water from the outside, for example, when foaming is carried out in situ on wet walls, undesired side reactions occur. Furthermore, deprivation of moisture by the isocyanate would impede the setting of fresh mortar or concrete and cause damage to the constructional elements.

In contradistinction to the known processes for the manufacture of foam plastics, the process of the invention is insensitive to water and water is even set free in the course of the reaction. Unset mortar and concrete which are foamed using the process of the invention set in an unobjectionable manner.

As an example of a compound containing radicals carrying CH-acid hydrogen, the reaction product of an adipic acid glycol polyester with terminal OH-groups and diketene may be mentioned. The compound corresponds to the formula

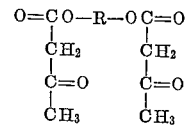

in which R stands for the radical of a polyester of adipic acid and ethylene glycol having a molecular weight in the range of about 400 to 4000.

In the reaction of the invention, at least the stoichiometric quantity of aldehyde equivalent to one acid hydrogen per group is used. If, for example, primary amines and/or CH-acid compounds with two active hydrogen atoms are used, the reaction may proceed further and require more aldehyde.

The properties of the products obtained by the process of the invention may therefore be varied within wide limits. With an increasing degree of reaction of aldehyde, the degree of cross-linking of the product obtained by the process of the invention increases.

As polyesters there may be used compounds with a low acid number that have been obtained by known processes, for example, from polybasic acids such, for example, as adipic acid or phthalic acid, and polyhydric alcohols such, for example, as ethylene glycol, butylene glycol, glycerine, hexanetriol or trimethylol propane.

As polyethers there may be used compounds that have been obtained, for example, in known manner by homopolymerization or block copolymerization of ethylene oxide, propylene oxide or tetrahydrofurane.

Examples of polyols suitable for use in the process of the invention are ethylene glycol, propylene glycol, butanediol, glycerine, hexanetriol and high molecular weight hydrocarbons carrying OH-groups.

Suitable polyamines which carry radicals containing CH-acid hydrogen at the nitrogen atom are aliphatic, aromatic or heterocyclic compounds containing primary or secondary amino groups. Examples of such compounds are ethylenediamine, propylenediamine, butylenediamine, piperazine, phenylenediamine and benzidine.

Amine-$CO_2$ reaction products suitable for use in the process of the invention are, for example, those obtained from di- or polyamines with primary or secondary amino groups which can be reacted with $CO_2$ to yield the corresponding carbaminates. Examples of such compounds are ethylenediamine, 1,3-propylenediamine, 1,2-propylenediamine, 1,4-butylenediamine, 1,3-butylenediamine, 1,6-hexamethylenediamine, piperazine, C-substituted piperazines and ethyleneglycol-bis-γ-aminopropyl ether.

As aldehyde, formaldehyde may advantageously be used for the process of the invention. It is, however, also possible to use higher aldehydes, for example, acetaldehyde or crotonaldehyde.

By radicals containing CH-acid hydrogen there are here meant those in which one or more hydrogen atoms at the carbon atom are activated by electron-attracting groups as, for example, in

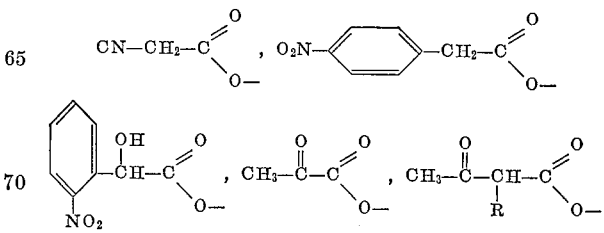

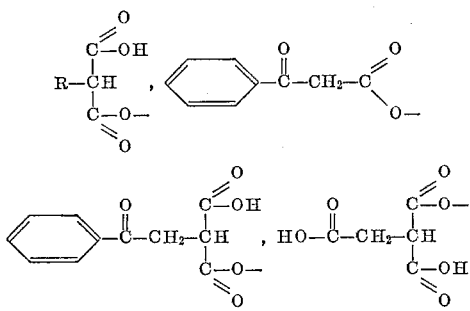

Compounds containing the acetoacetic acid radical

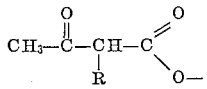

are particularly suitable. These compounds have, inter alia, the advantage that they may easily be obtained by reacting compounds that carry groups capable of being acylated, for example OH or NH, with diketene.

The above mentioned CH-acid radicals may be linked to compounds containing at least two groups capable of being acylated. Polyalcohols such, for example, as butanediol, pentaerythritol, linear or branched polyesters with terminal OH-groups, polyethers such, for example, as polyethylene glycol, polypropylene glycol or polytetrahydrofurane, polyamines such, for example, as hexamethylenediamine, polyethers or polyesters containing at least two primary or secondary amino groups, or aminoalcohols may be mentioned as examples of such compounds.

The above mentioned compounds can be obtained in known manner.

To obtain uniform foams with a determined pore density, it is advantageous to add a small amount of a surface active substance. Exemplary of such surface active substances are polysiloxanes, block copolymers of polysiloxanes with polyethylene oxides, oxalkylated phenols, oxalkylated alcohols, oxalkylated fatty acids, fat alcohol sulfates, alkyl sulfonates, aryl sulfonates and block condensation products of polyethylene oxide and polypropylene oxide.

The process of the invention is advantageously carried out in the following manner.

The compound carrying CH-acid groups is mixed with the reaction product of polyamine and carbon dioxide and the mixture so obtained is mixed with the aldehyde. The three components are used in equivalent amounts. Shortly after the addition of the aldehyde, evolution of gas takes place at a speed which corresponds exactly to the speed of condensation as is evident from the following assumed scheme:

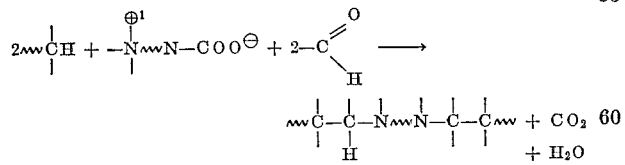

The speed at which the condensation reaction takes place is not critical within certain limits since, when the condensation is slow and the batch therefore becomes viscous only slowly, the evolution of gas is also uniformly slow. When the condensation proceeds at a high speed, the evolution of gas takes place at a correspondingly high speed, and in this case uniform foaming is also ensured since condensation and liberation of expanding agent are associated with one another.

In general, no further expanding agent need be added. Nor is it in general necessary to supply heat from the exterior since the reaction proceeds at a sufficient speed at room temperature. It may, however, be advantageous to concomitantly use a low boiling solvent as an expanding agent.

As low boiling solvents to be used as expanding agents in the process of the invention there may advantageously be used liquefied halogen-substituted alkanes, for example, monofluorotrichloromethane, dibromodifluoromethane, 1,1,2-tirchloro-1,2,2-trifluoromethane, dichlorofluoromethane, dichlorotetrafluoromethane, trifluorobromomethane or methylene chloride or mixtures of these substances. Hydrocarbons such as pentane or hexane, or ethers such as diethyl ether may also be used.

Copolymers suitable for use in the process of the invention are those which are compatible with the other components carrying CH-acid radicals and yield homogeneous mixtures. There may advantageously be used those which are reciprocally soluble with the above compounds carrying CH-acid radicals. Advantageously copolymers are used that are liquid or highly viscous at room temperature.

Exemplary of such copolymers are copolymers of a variety of monomers with allyl esters or vinyl esters of β-keto-carboxylic acids, other unsaturated polymerizable dicarbonyl compounds or unsaturated polymerizable compounds carrying hydrogen which has been activated by electron-attracting groups such as the carbonyl or the nitrile group at the carbon atom. There may particularly be mentioned allyl esters and vinyl esters of acetoacetic acid and the derivatives thereof and unsaturated malonic acid derivatives, particularly copolymers of vinyl acetate, vinyl isobutyrate or vinyl chloride, on the one hand, and acetoacetic acid allyl ester, on the other hand.

Unsaturated derivatives of other acids may, in principle, also be used as substances carrying active hydrogen in the telomer. Exemplary of such substances are cyanoacetic acid, p-nitrophenylacetic acid, o-nitrophenyl-α-hydroxyacetic acid, acetophenone malonic acid, alkylmalonic acid, benzoylacetic acid, pyruvic acid, α-alkylacetoacetic acid and 1-carboxy-2,2-dicarboxyethane. Examples of suitable monomers capable of forming the above mentioned copolymers with the above allyl and vinyl esters are vinyl esters such as vinyl acetate or styrene, acrylic acid esters such as methyl acrylate, methacrylic acid esters such as methylmethacrylate, ethylene or vinyl chloride.

The amount of the above mentioned compounds in the mixtures depends on the nature of the desired foam plastic. For example, 5 to 95% of the polyesters, polyethers, polyols or polyamines which carry the acid hydrogen may be replaced by the above copolymers.

The following examples serve to illustrate the invention but they are not intended to limit it thereto, the parts being by weight.

Example 1

A mixture of 18.4 parts of a branched polyether having an OH-number of 350 and an acid number <1,
14.3 parts of a branched polyester of adipic acid-phthalic acid-oleic acid-trimethylol propane having an OH-number of 350 and an acid number <1, and
8.2 parts of N,N,N',N'-tetrahydroxy-ethyl-ethylenediamine in which compounds the free OH-groups had been acetoacetylated, was stirred with 13 parts of the reaction product of piperazine and carbon dioxide. Into the viscous paste so obtained 1.05 parts of a mixture of an oxalkylated fatty acid mixture and polysiloxane were then introduced while stirring, in order to adjust the pores. 12 parts of a 50% solution of formaldehyde in methanol were then introduced, using an impeller, and the creamy homogeneous mixture so obtained was introduced into a foaming vessel. Foaming was terminated after a few minutes.

A finely porous foam plastic was obtained, which could be removed from the mould after a short time and had reached its final degree of solidification after a few hours. The unit weight amounted to 30 grams per liter.

Example 2

67.8 parts of a little branched polyester of adipic acid-diethylene glycol and a triol having an OH-number of 60 and an acid number <2, the hydroxyl groups of which had been acetoacetylated, were uniformly stirred with 3.9 parts of piperazine carbaminate and 0.8 part of polysiloxane and rapidly made into a creamy paste with 3.6 parts of a 50% solution of formaldehyde in methanol. The mixture so obtained was poured on to a plate. After a few minutes an expanded rubber-like foam having a unit weight of 200 grams per liter was obtained.

Example 3

36.8 parts of a branched polyether having an OH-number of 350 and an acid number <1, 28.6 parts of a branched polyester of adipic acid-phthalic acid-oleic acid-trimethylol propane having an OH-number of 350 and an acid number <1, and 16.4 parts of N,N,N′,N′-tetrahydroxyethylethylenediamine, in which compounds the OH-groups had been acetoacetylated, were thoroughly mixed.

To the mixture so obtained, 20 parts of finely ground titanium dioxide and 26 parts of the reaction product of piperazine and carbon dioxide were added. 24 parts of a 50% solution of formaldehyde in methanol containing 2 parts of one of the above mentioned water-soluble surface active substances to adjust the pores were then added using an impeller. The creamy homogeneous product so obtained was poured into a foaming mould. After a few minutes foaming was terminated. After drying, a rigid foam having a unit weight of 75 grams per liter was obtained.

Example 4

354 parts of the reaction product of a trimethylol propane-propylene oxide-polyether having an OH-number of 561 with diketene, 420 parts of the reaction product of a trimethylol propane-propylene oxide-polyether having an OH-number of 404 with diketene and 150 parts of a copolymer of vinyl acetate, vinyl isobutyrate and acetoacetic acid allyl ester, the proportion of acetoacetic acid allyl ester amounting to 24%, were intimately mixed. Into the clear homogeneous mixture so obtained there were successively introduced while stirring 12 parts of an oxethylated nonylphenol as surface active substance, 220 parts of the reaction product of piperazine and carbon dioxide and finally 240 parts of a 50% solution of formaldehyde in methanol.

Immediately after the introduction of the formaldehyde foaming set in. A semi-rigid foam plastic with open pores having a unit weight of 35 grams per liter was obtained.

Example 5

200 parts of the reaction product of a propoxylated pentaerythritol having an OH-number of 560 with diketene, 160 parts of the reaction product of a propoxylated trimethylol propane having an OH-number of 404 with diketene and 150 parts of a copolymer of vinyl acetate, vinyl isobutyrate and acetoacetic acid allyl ester having an average molecular weight of 1680, were thoroughly mixed. To the mixture so obtained 4.5 parts of an oxalkylated fatty acid mixture and 4.5 parts of a water-soluble polysiloxane were added.

120 parts of a reaction product of piperazine and carbon dioxide and finally 270 parts of a 50% solution of formaldehyde in methanol were then added to the reaction mixture, using an impeller.

The batch was introduced into a mould and foamed to yield a foam plastic having open pores. After drying at room temperature, the foam plastic had a unit weight of 30 grams per liter.

Example 6

350 parts of the reaction product of a propoxylated pentaerythritol having an OH-number of 560 with diketene, 354 parts of the reaction product of a propoxylated trimethylol propane having an OH-number of 561 with diketene, 200 parts of a copolymer of ethylene and acetoacetic acid allyl ester having a molecular weight of 950, the proportion of the acetoacetic acid allyl ester being about 25%, 7 parts of an oxalkylated fatty acid mixture and 7 parts of a water-soluble polysiloxane were homogeneously mixed. Into the mixture so obtained 250 parts of the reaction product of piperazine and carbon dioxide were introduced, while stirring. 250 parts of a 50% solution of formaldehyde in methanol were added and, after homogenizing, the reaction mixture was introduced into a foaming vessel.

An elastic soft foam having open pores and a unit weight of 60 grams per liter was obtained.

Examples 7 to 12

The parts indicated in the following table of a tetra-acetoacetic acid ester based on a propoxylated pentaerythritol, having a molecular weight of about 800 and a copolymer of vinyl isobutyrate and allylacetoacetic acid ester having an average molecular weight of 1200 and a content of acetoacetic acid ester of about 40%, were thoroughly mixed. Into the mixture so obtained 0.2 part of an oxalkylated fatty acid mixture and 0.2 part of a water-soluble polysiloxane were introduced while stirring. Then 11 parts of piperazine carbaminate were added and the reaction mixture was rapidly stirred with 13 parts of a 50% solution of formaldehyde in methanol to yield a homogeneous mixture.

Immediately after the batch had been poured into a foaming vessel, foaming set in. The foam plastics so obtained had uniformly fine pores; their density was as indicated in the following table.

TABLE

| Example | Tetra-acetoacetic acid ester | Copolymer | g./l. |
|---|---|---|---|
| 7 | 19.8 | 35.5 | 35 |
| 8 | 17.8 | 39.0 | 35 |
| 9 | 15.8 | 42.6 | 39 |
| 10 | 11.9 | 49.7 | 38 |
| 11 | 9.9 | 53.2 | 45 |
| 12 | 7.9 | 56.8 | 59 |

Example 13

50 parts of a tetra-acetoacetate based on a propoxylated pentaerythritol having a molecular weight of about 500 and 50 parts of a copolymer of vinyl chloride and acetoacetic acid allyl ester having an average molecular weight of 850, the proportion of the acetoacetic acid allyl ester being 23%, were mixed with 0.6 part of a block copolymer of polysiloxane with polyethylene oxide as surface active substance. 17.8 parts of piperazine carbaminate were then introduced, while stirring, to obtain a homogeneous mixture. After the addition of 21 parts of a 50% solution of formaldehyde in methanol, the batch was poured into a foaming mould.

After a few minutes the foam plastic could be removed from the mould. After drying the foam plastic had a unit weight of 35 grams per liter.

We claim:

1. A porous foamed plastic composition which comprises the reaction product, formed at about room temperature without the addition of a substantial amount of external heat, of (A) about one equivalent of a compound having at least two acidic hydrogen atoms each on a carbon atom immediately adjacent a carboxyl group or a nitrilo group, which compound is a condensation product of (1)(a) a polyester reaction product of a polybasic acid and a polyhydric alcohol, (b) a polyether homopolymerization or block copolymerization product of ethylene oxide, propylene oxide tetrahydrofurane, (c) an aliphatic polyol, or (d) an aliphatic, an aromatic or a heterocyclic primary or secondary polyamine, and contains (2) a radical

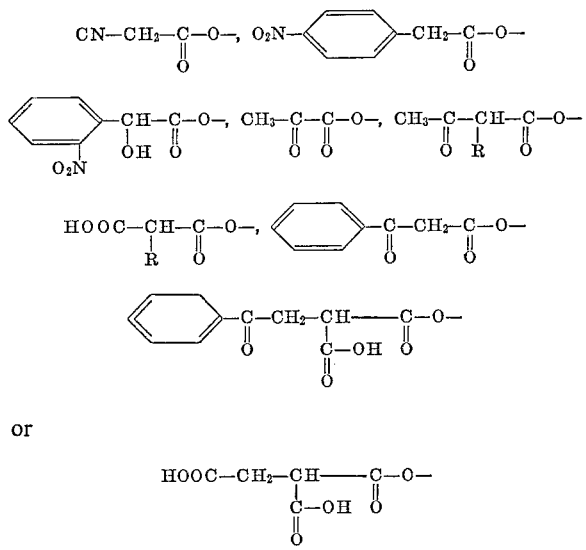

or $$HOOC-CH_2-CH(C-OH)(\overset{\parallel}{O})-\overset{\parallel}{C}-O-$$

wherein R is a hydrogen atom or a lower alkyl group, (B) about one equivalent of a carbamate that is the reaction product of a primary or a secondary polyamine and carbon dioxide, and (C) an aldehyde, said aldehyde being used in a quantity such that the stoichiometric amount of aldehyde groups is at least about equivalent to the stoichiometric amount of acidic hydrogen atoms.

2. A porous foamed plastic composition according to claim 1 wherein said aldehyde (C) is a lower aliphatic aldehyde.

3. A porous foamed plastic composition according to claim 1 wherein said aldehyde (C) is formaldehyde.

4. A porous foamed plastic composition according to claim 1 wherein said polyamine of said carbamate (B) is an alkylenepolyamine of up to about 6 carbon atoms, an alkylene-bis-aminoalkoxy ether of up to about 4 carbon atoms in said alkylene and in said aminoalkoxy groups, a piperazine, or a salt thereof.

5. A porous foamed plastic composition according to claim 1 wherein said polyamine of said carbamate (B) is an ethylenediamine, a propylenediamine, a butylenediamine, a hexamethylenediamine, an ethyleneglycol-bis-aminopropyl ether, piperazine, or an acetate salt thereof.

6. A porous foamed plastic composition according to claim 1 wherein said compound A(2) is diketene.

7. A porous foamed plastic composition according to claim 1 wherein said polyester A(1)(a) is a reaction product of adipic acid or phthalic acid with ethylene glycol, butylene glycol, glycerine, hexanetriol or trimethylol propane, said polyol A(1)(c) is ethylene glycol, propylene glycol, butanediol, glycerine, hexanetriol or a monomeric high molecular weight aliphatic hydrocarbon having —OH groups, and said polyamine A(1)(d) is an ethylenediamine, a propylenediamine, a butylenediamine, a phenylenediamine, a piperazine or a benzidine.

8. A porous foamed plastic composition according to claim 1 wherein from about 5% to about 95% by weight of said condensation product (A) is replaced by a copolymer of (1) vinyl acetate, vinyl isobutyrate, vinyl chloride, styrene, ethylene, methyl acrylate or methylmethacrylate with (2) a vinyl ester or an allyl ester of acetoacetic acid, lower alkyl acetoacetic acid, cyanoacetic acid, nitrophenylacetic acid, hydroxyacetic acid, lower alkyl malonic acid, acetophenone malonic acid, benzoylacetic acid, pyruvic acid or tris-(carboxy)-ethane.

9. A porous foamed plastic composition according to claim 8 wherein said copolymer is the polymerization product of vinyl acetate, vinyl isobutyrate or vinyl chloride with vinyl acetoacetate or allyl acetoacetate.

10. A process for the preparation of a porous foamed plastic composition which comprises reacting, at about room temperature without the addition of a substantial amount of external heat, (A) about one equivalent of a compound having at least two acidic hydrogen atoms each on a carbon atom immediately adjacent a carboxyl group or a nitrilo group, which compound is a condensation product of (1)(a) a polyester reaction product of a polybasic acid and a polyhydric alcohol, (b) a polyether homopolymerization or block copolymerization product of ethylene oxide, propylene oxide or tetrahydrofurane, (c) an aliphatic polyol, or (d) an aliphatic, an aromatic or a heterocyclic primary or secondary polyamine, and contains (2) a radical

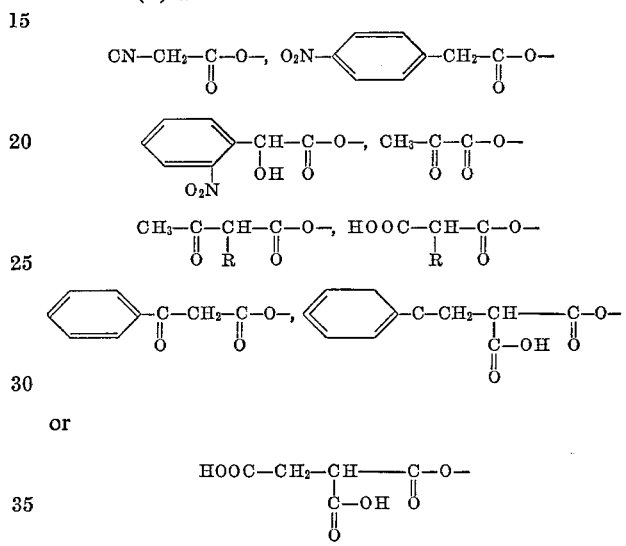

or $$HOOC-CH_2-CH(C-OH)(\overset{\parallel}{O})-\overset{\parallel}{C}-O-$$

wherein R is a hydrogen atom or a lower alkyl group, (B) about one equivalent of a carbamate that is the reaction product of a primary or a secondary polyamine and carbon dioxide, and (C) an aldehyde, said aldehyde being reacted in a quantity such that the stoichiometric amount of aldehyde groups is at least about equivalent to the stoichiometric amount of acidic hydrogen atoms.

11. A process for the preparation of a porous foamed plastic composition according to claim 10 wherein said aldehyde (C) is a lower aliphatic aldehyde.

12. A process for the preparation of a porous foamed plastic composition according to claim 10 wherein said aldehyde (C) is formaldehyde.

13. A process for the preparation of a porous foamed plastic composition according to claim 10 wherein said polyamine of said carbamate (B) is an alkylenepolyamine of up to about 6 carbon atoms, an alkylene-bis-aminoalkoxy ether of up to about 4 carbon atoms in said alkylene and in said aminoalkoxy groups, a piperazine, or a salt thereof.

14. A process for the preparation of a porous foamed plastic composition according to claim 10 wherein said polyamine of said carbamate (B) is an ethylenediamine, a propylenediamine, a butylenediamine, a hexamethylenediamine, an ethylene-glycol-bis-aminopropyl ether, piperazine, or an acetate salt thereof.

15. A process for the preparation of a porous foamed plastic composition according to claim 10 wherein said compound A(2) is diketene.

16. A process for the preparation of a porous foamed plastic composition according to claim 10 wherein said polyester A(1)(a) is a reaction product of adipic acid or phthalic acid with ethylene glycol, butylene glycol, glycerine, hexanetriol or trimethylol propane, said polyol A(1)(c) is ethylene glycol, propylene glycol, butanediol, glycerine, hexanetriol or a monomeric high molecular weight aliphatic hydrocarbon having —OH groups, and said polyamine A(1)(d) is an ethylenediamine, a propylenediamine, a butylenediamine, a phenylenediamine, a piperazine or a benzidine.

17. A process for the preparation of a porous foamed plastic composition according to claim 10 wherein from about 5% to about 95% by weight of said condensation product (A) is replaced by a copolymer of (1) vinyl acetate, vinyl isobutyrate, vinyl chloride, styrene, ethylene, methyl acrylate or methylmethacrylate with (2) a vinyl ester or an allyl ester of acetoacetic acid, lower alkyl acetoacetic acid, cyanoacetic acid, nitrophenylacetic acid, hydroxyacetic acid, lower alkyl malonic acid, acetophenone malonic acid, benzoylacetic acid, pyruvic acid or tris-(carboxy)-ethane.

18. A process for the preparation of a porous foamed plastic composition according to claim 17 wherein said copolymer is the polymerization product of vinyl acetate, vinyl isobutyrate or vinyl chloride with vinyl acetoacetate or allyl acetoacetate.

References Cited
UNITED STATES PATENTS

| | | | |
|---|---|---|---|
| 2,326,006 | 8/1943 | Bruson | 260—64 |
| 2,390,153 | 12/1945 | Kern | 260—72 |
| 2,475,273 | 7/1949 | Adelson et al. | 260—63 |
| 2,755,268 | 7/1956 | Uelzmann | 260—64 |
| 3,236,913 | 2/1966 | Pfeiffer et al. | 260—851 |
| 3,275,587 | 9/1966 | Weller et al. | 260—29.2 |
| 3,311,575 | 3/1967 | Graham | 260—2.5 |

OTHER REFERENCES

"Modern Plastics Encyclopedia for 1964," vol. 41, No. IA, September 1963, pp. 364–370.

MURRAY TILLMAN, *Primary Examiner.*

J. C. BLEUTGE, *Assistant Examiner.*